United States Patent
Choi

(10) Patent No.: US 8,281,320 B2
(45) Date of Patent: Oct. 2, 2012

(54) EVENT ALERTING SYSTEM USING A DYNAMIC LOCAL GROUPING, AND A METHOD THEREOF

(75) Inventor: Sung-Wone Choi, Seoul (KR)

(73) Assignee: NHN Corporation, Seongnam-si (KR)

(*) Notice: Subject to any disclaimer, the term of this patent is extended or adjusted under 35 U.S.C. 154(b) by 1276 days.

(21) Appl. No.: 11/571,505

(22) PCT Filed: Jul. 21, 2005

(86) PCT No.: PCT/KR2005/002359
§ 371 (c)(1),
(2), (4) Date: Dec. 29, 2006

(87) PCT Pub. No.: WO2006/009402
PCT Pub. Date: Jan. 26, 2006

(65) Prior Publication Data
US 2008/0066082 A1    Mar. 13, 2008

(30) Foreign Application Priority Data

Jul. 21, 2004   (KR) .................. 10-2004-0056755

(51) Int. Cl.
*G06F 15/163* (2006.01)
(52) U.S. Cl. .................. 719/318; 709/201; 709/238
(58) Field of Classification Search .................. 719/318
See application file for complete search history.

(56) References Cited

U.S. PATENT DOCUMENTS 5,666,531 A * 9/1997 Martin .................. 707/204
7,016,351 B1 * 3/2006 Farinacci et al. .............. 370/392
2002/0173321 A1 * 11/2002 Marsden et al. .............. 455/500
2003/0074453 A1 * 4/2003 Ikonen .................. 709/228
2003/0091267 A1 * 5/2003 Alvarez et al. .................. 385/16

OTHER PUBLICATIONS

Carzaniga, Antonio. Architectures for an Event Notification Service Scalable to Wide-Area Networks. (Dec. 1998). [retrieved from http://www.inf.usi.ch/carzaniga/papers/ on Jan. 19, 2010]. pp. 1-69.*
Meier, René and Vinny Cahill. Exploiting Proximity in Event-Based Middleware for Collaborative Mobile Applications. Distributed Applications and Interoperable Systems (DAIS '03). Nov. 17-21, 2003. pp. 285-296 [retrieved from http://www.springerlink.com/content/xdxa0eh914mk/?sortorder=asc&p_o=20 on Jan. 19, 2010].*

(Continued)

*Primary Examiner* — H. S. Sough
*Assistant Examiner* — Brian Wathen
(74) *Attorney, Agent, or Firm* — H.C. Park & Associates, PLC

(57) ABSTRACT

Disclosed is an event alerting system and method using dynamic local grouping for 1:N event alerting. The event alerting method for an event alerting server to transmit an event message to clients connected on a network includes a) receiving an event alerting request from clients having generated events, or generating an event by the event alerting server, b) grouping the clients according to areas with reference to a transmission distance to the respective clients according to a client list by the event alerting server, c) transmitting a client list of the grouped areas and an alerting data packet to a plurality of master clients selected by the grouping process, and d) transmitting a client list and an alerting data packet to a master client from the master client of an upper group up to the last layer established by performing the grouping process again.

33 Claims, 19 Drawing Sheets

OTHER PUBLICATIONS

Cain et al, Internet Group Management Protocol, Version 3 [retrieved from http://tools.ietf.org/pdf/rfc3376 on Jan. 20, 2010] pp. 1-25.*

Opyrchal, L; Astley, M.; Auerbach, J.; Bauavar, G.; Strom, R.; Sturman, D., Exploiting IP Multicast in COntent-Based Publish-Subscribe Systems. Lecture Notes in Computer Science. Middleware 2000, Springer, Berlin. [retrieved from http://www.springerlink.com/content/kqkuveaqh744bcqq/ on May 7, 2010].*

Taylor, Richard N., Syllabus for Information and Comptuer Science 280E Software Architectures and Internet Protocols (Feb. 2, 2000), University of California, Irvine [online] [retrieved from http://www.ics.uci.edu/%7Etaylor/ics280e/syllabus.html on May 7, 2010].*

Eugster, P.; Guerraoui, R.; Damm, C.H., On Objects and Events, ACM SIGPLAN Notices, vol. 36, Issue 11 (Nov. 2001), pp. 254-269. [retrieved from http://portal.acm.org/citation.cfm?id=504301 on May 7, 2010].*

English language abstract of Korean Publication No. 2000-0073381.
English language abstract of Korean Publication No. 2001-0017642.
English language abstract of Korean Publication No. 2002-0017926.
English language abstract of Japanese Publication No. 08-161249.

* cited by examiner

Figure 11

| User ID | Group ID | User IP Address | Local Info | Layer | Master flag | Slave flag | On/Off |
|---|---|---|---|---|---|---|---|
| AA | A | 220.73.249.30 | 135-080 | 1 | 1 | 0 | 1 |
| Aa | A | 220.73.249.35 | 135-060 | 1 | 0 | 1 | 1 |
| Ab | A | 220.73.249.40 | 135-085 | 1 | 0 | 1 | 1 |
| BB | | 165.246.150.29 | 120-060 | 2 | 0 | 0 | 1 |
| Ba | | 165.246.130.33 | 120-030 | 2 | 0 | 0 | 1 |
| Bb | | 165.246.150.44 | 120-030 | 2 | 0 | 0 | 1 |
| CC | | 130.57.2.120 | 130-030 | 2 | 0 | 0 | 1 |
| Ca | | 130.57.5.130 | 130-020 | 2 | 0 | 0 | 1 |
| Cb | | 130.57.2.122 | 130-030 | 2 | 0 | 0 | 1 |
| DD | | 165.246.140.38 | 121-040 | 2 | 0 | 0 | 1 |
| Da | | 165.246.140.20 | 121-030 | 2 | 0 | 0 | 1 |
| Db | | 165.246.140.55 | 121-045 | 2 | 0 | 0 | 1 |
| EE | | 165.246.120.20 | 122-050 | 2 | 0 | 0 | 1 |
| Ea | | 165.246.120.55 | 122-060 | 2 | 0 | 0 | 1 |
| Eb | | 165.246.120.33 | 122-054 | 2 | 0 | 0 | 1 |
| FF | | 130.57.30.2 | 131-050 | 2 | 0 | 0 | 1 |
| Fa | | 130.57.30.5 | 131-051 | 2 | 0 | 0 | 1 |
| Fb | | 130.57.30.6 | 131-053 | 2 | 0 | 0 | 1 |
| GG | | 130.57.20.10 | 133-060 | 2 | 0 | 0 | 1 |
| Ga | | 130.57.20.4 | 133-063 | 2 | 0 | 0 | 1 |
| Gb | | 130.57.20.5 | 133-065 | 2 | 0 | 0 | 1 |

Figure 13

| User ID | Group ID | User IP Address | Local Info | Layer | Master flag | Slave flag | On/Off |
|---|---|---|---|---|---|---|---|
| BB | B | 165.246.150.20 | 120-050 | 1 | 1 | 0 | 1 |
| Ba | B | 165.246.150.23 | 120-040 | 1 | 0 | 1 | 1 |
| Bb | B | 165.246.150.44 | 120-050 | 1 | 0 | 1 | 1 |
| CC | C | 130.57.2.120 | 130-030 | 1 | 1 | 0 | 1 |
| Ca | C | 130.57.5.130 | 130-020 | 1 | 0 | 1 | 1 |
| Cb | C | 130.57.2.122 | 130-030 | 1 | 0 | 1 | 1 |
| DD | B | 165.246.140.38 | 121-040 | 2 | 0 | 0 | 1 |
| Da | B | 165.246.140.20 | 121-043 | 2 | 0 | 0 | 1 |
| EE | B | 165.246.140.55 | 122-050 | 2 | 0 | 0 | 1 |
| Ea | B | 165.246.120.20 | 122-060 | 2 | 0 | 0 | 1 |
| Eb | B | 165.246.120.33 | 122-054 | 2 | 0 | 0 | 1 |
| FF | C | 130.57.30.2 | 131-050 | 2 | 0 | 0 | 1 |
| Fa | C | 130.57.30.5 | 131-051 | 2 | 0 | 0 | 1 |
| Fb | C | 130.57.30.6 | 131-053 | 2 | 0 | 0 | 1 |
| GG | C | 130.57.20.10 | 133-060 | 2 | 0 | 0 | 1 |
| Ga | C | 130.57.20.4 | 133-063 | 2 | 0 | 0 | 1 |
| Gb | C | 130.57.23.5 | 133-065 | 2 | 0 | 0 | 1 |

Figure 14

| User ID | Group ID | User IP Address | Local Info | Layer | Master flag | Slave flag | On/Off |
|---|---|---|---|---|---|---|---|
| BB | B | 165.246.150.29 | 120-050 | 1 | 1 | 0 | 1 |
| Ba | B | 165.246.150.33 | 120-060 | 1 | 0 | 1 | 1 |
| Bb | B | 165.246.150.44 | 120-050 | 1 | 0 | 1 | 1 |
| DD | B | 165.246.140.38 | 121-040 | 2 | 0 | 0 | 1 |
| Da | B | 165.246.140.20 | 121-030 | 2 | 0 | 0 | 1 |
| Db | B | 165.246.140.55 | 121-045 | 2 | 0 | 0 | 1 |
| EE | B | 165.246.120.20 | 122-050 | 2 | 0 | 0 | 1 |
| Ea | B | 165.246.120.55 | 122-060 | 2 | 0 | 0 | 1 |
| Eb | B | 165.246.120.33 | 122-054 | 2 | 0 | 0 | 1 |

| User ID | Group ID | User IP Address | Local Info | Layer | Master flag | Slave flag | On/Off |
|---|---|---|---|---|---|---|---|
| CC | C | 130.57.2.120 | 130-030 | 1 | 1 | 0 | 1 |
| Ca | C | 130.57.5.130 | 130-020 | 1 | 0 | 1 | 1 |
| Cb | C | 130.57.2.122 | 130-030 | 1 | 0 | 1 | 1 |
| FF | C | 130.57.30.2 | 131-050 | 2 | 0 | 0 | 1 |
| Fa | C | 130.57.30.5 | 131-051 | 2 | 0 | 0 | 1 |
| Fb | C | 130.57.30.6 | 131-053 | 2 | 0 | 0 | 1 |
| GG | C | 130.57.20.10 | 133-060 | 2 | 0 | 0 | 1 |
| Ga | C | 130.57.20.4 | 133-063 | 2 | 0 | 0 | 1 |
| Gb | C | 130.57.20.5 | 133-065 | 2 | 0 | 0 | 1 |

Figure 16

| User ID | Group ID | User IP Address | Local Info | Layer | Master flag | Slave flag | On/Off |
|---|---|---|---|---|---|---|---|
| DD | D | 165.246.140.38 | 121-040 | 1 | 1 | 0 | 1 |
| Da | D | 165.246.140.20 | 121-030 | 1 | 0 | 1 | 1 |
| Db | D | 165.246.140.55 | 121-045 | 1 | 0 | 1 | 1 |
| EE | E | 165.246.120.20 | 122-050 | 1 | 1 | 0 | 1 |
| Ea | E | 165.246.120.55 | 122-080 | 1 | 0 | 1 | 1 |
| Eb | E | 165.246.120.33 | 122-054 | 1 | 0 | 1 | 1 |

Figure 17

| User ID | Group ID | User IP Address | Local Info | Layer | Master flag | Slave flag | On/Off |
|---|---|---|---|---|---|---|---|
| DD | D | 165.246.140.38 | 121-040 | 1 | 1 | 0 | 1 |
| Da | D | 165.246.140.20 | 121-030 | 1 | 0 | 1 | 1 |
| Db | D | 165.246.140.55 | 121-045 | 1 | 0 | 1 | 1 |

| User ID | Group ID | User IP Address | Local Info | Layer | Master flag | Slave flag | On/Off |
|---|---|---|---|---|---|---|---|
| EE | E | 165.246.120.20 | 122-050 | 1 | 1 | 0 | 1 |
| Ea | E | 165.246.120.55 | 122-060 | 1 | 0 | 1 | 1 |
| Eb | E | 165.246.120.33 | 122-054 | 1 | 0 | 1 | 1 |

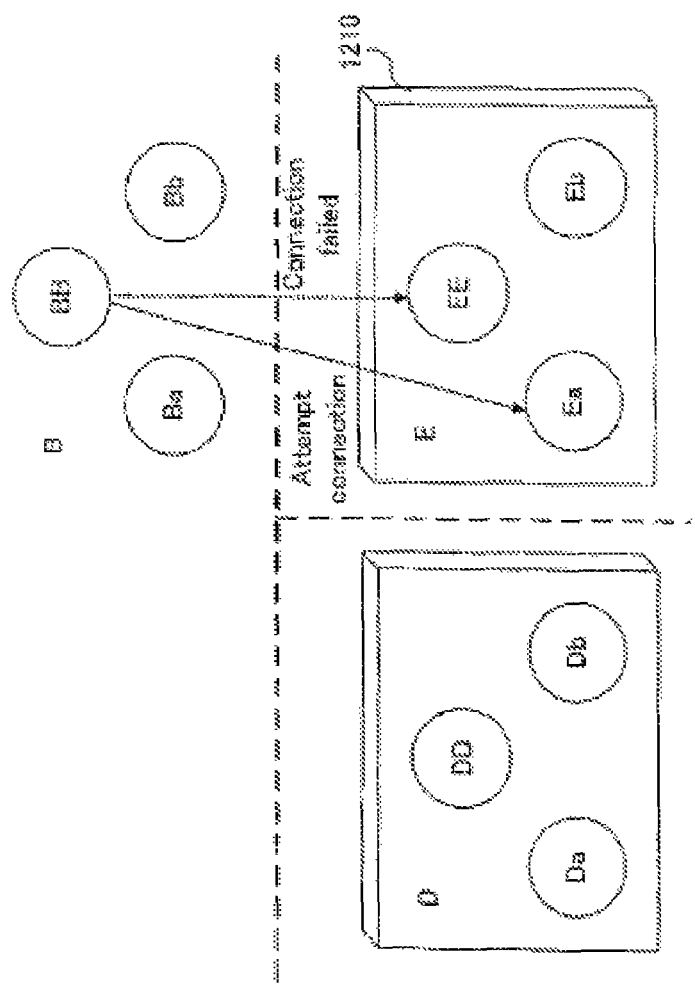

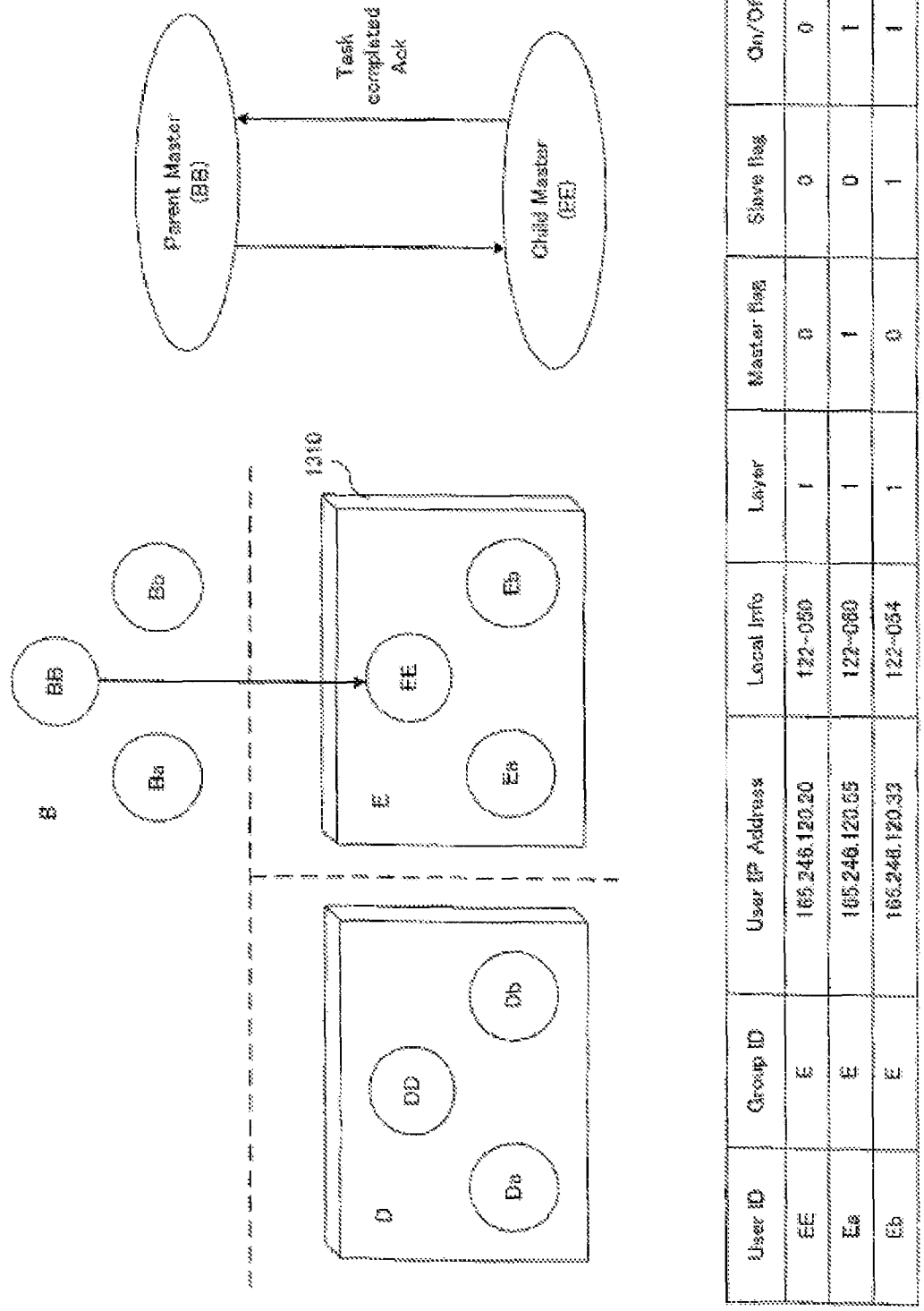

US 8,281,320 B2

EVENT ALERTING SYSTEM USING A DYNAMIC LOCAL GROUPING, AND A METHOD THEREOF

TECHNICAL FIELD

The present invention relates to an event alerting system using dynamic local grouping and a method thereof. More specifically, the present invention relates to an event alerting system using dynamic local grouping and a method thereof for 1:N event alerting based on a messenger.

BACKGROUND ART

Various communities and human connection networks have been generated on the Internet as Internet using people have greatly increased. Millions of communities with several to hundreds of thousands of members have been supported by large Internet portal sites.

Users as members of the above-noted communities or specific human networks have desired to know personal activities or events, and hence, systems for controlling a messenger or an Internet system and alerting corresponding events to respective clients have been developed. In this instance, the events represent tasks or activities that are generated when the users belonging to the corresponding groups or individual users perform community activities, and they include new articles registered by community members and new notice comments provided to community members by community managers. The events can be notified to the respective members by using a messenger, for example.

A conventional event alerting method includes an event alerting scheme based on a messenger having a large alerting system at the center of the messenger. The event alerting system manages a list of clients for receiving corresponding alerting messages and broadcasts corresponding events to the respective clients.

FIG. 1 shows a conventional messenger-based event alerting system, and FIG. 2 shows a flowchart for a conventional messenger-based event alerting method.

Referring to FIG. 1, the conventional messenger-based event alerting system includes a messenger-based event alerting server 110, a client list 120, and a plurality of clients 151, 152, and 153 belonging to various groups or communities 140, 150, and 160, which are connected to a network 130.

First, the conventional messenger-based event alerting system generally uses a method for using a client list 120 to be alerted in the format of a "reverse buddy."

In detail and with reference to FIG. 2, in the conventional messenger-based event alerting method, an event generation status is checked in step S210, and when an event of A, B, or C is exemplarily generated, the messenger-based event alerting server 110 that is a central alerting system searches the client list in step S220. The event of A, B, or C is respectively transmitted to the searched clients in the group or the communities 140, 150, and 160 in step S230. A status of generating an additional event is checked in step S240, and when an additional event is found, the steps of S220 and S230 are repeated.

However, when the client list 120 is provided in a like manner of the conventional messenger-based event alerting system, first, the events are transmitted irrespective of the clients' 151, 152, and 153 online access states so that useless traffic may be generated, second, an overhead of always referring to the client list to be registered to each event is generated, and third, the capacity of the messenger server 110 for alerting events must be high enough to correspond to the product of the number of events and the average number of clients.

FIG. 3 shows a conventional event alerting system based on an event alerting unit, and FIG. 4 shows a flowchart for a conventional event alerting method based on an event alerting unit.

Referring to FIG. 3 and FIG. 4, the conventional event alerting system based on an event alerting unit includes an event alerting server 310 based on an event alerting unit, and a plurality of clients 241,242, and 243 belonging to various groups or communities 330, 340, and 350, which are connected to a network 320.

For example, when a user logs in to a server given in the format of a chat room and notifies an alert in the chat room in the above-described conventional event alerting system based on an event alerting unit, other users in the chat room are alerted.

In detail in the conventional event alerting method based in an event alerting unit, a status of generating an event is checked in step S410, and when an event of A, B, or C is generated, the central event alerting server 310 based in an event alerting unit only searches the logged-in clients 241 and 242 having entered the service in step S420. The event A, B, or C is respectively transmitted to the logged-in service subscribed client in step S430. A status of generating an additional event is checked in step S440, and when an additional event is found, the steps of S420 and S430 are repeated.

For example, when one client of the first community 330 alerts a request of generating an event A to the event alerting server 310, the event alerting server 310 notifies other clients of the first community 330 of the event A, and in this instance, no event is alerted to the clients that are not logged in. Further, the different event B or C is transmitted to the logged-in clients in other communities 340 and 350.

In the case of conventional management in the format of an event alerting unit, the clients in the online status are managed, differing from the above-described messenger based event alerting method to thus substantially reduce the load of the server, but when the number of clients is frequently changed or the number of clients for a specific event is very big, the process of other events may be delayed because of the corresponding event. Also, a server with a large capacity is required and traffic for event transmission provided to the central server cannot be ignored since the server alerts the event to the whole clients in a like manner of the messenger-based event alerting system.

DISCLOSURE

Technical Problem

It is an advantage of the present invention to provide an event alerting system using dynamic local grouping and a method thereof for reducing a load of an event alerting server by transmitting a grouped member list and alerting information to masters of a specific group from among dynamically grouped groups without transmitting an event alerting message to all the clients.

Technical Solution

In one aspect of the present invention, in an event alerting method for an event alerting server to transmit an event message to a plurality of clients connected on a network, an event alerting method using dynamic local grouping includes a) receiving an event alerting request from clients having generated events or generating an event by the event alerting server, b) grouping the clients according to areas with reference to a transmission distance to the respective clients according to a client list by the event alerting server, c) transmitting a client list of the grouped areas and an alerting data packet to a plurality of master clients selected by the grouping process, and d) transmitting a client list and an alerting data packet to a master client from the master client of an upper group up to the last layer established by performing the grouping process again.

In another aspect of the present invention, in an event alerting system for an event alerting server to transmit an event message to a plurality of clients connected on a network, an event alerting system using dynamic local grouping includes a client list database for storing personal information on a plurality of clients having joined an event alerting service, a client grouping means for performing grouping per areas with reference to transmission distances to the respective clients according to the client list when the client requests alerting by generating an event, an alerting data processor for converting the alerting data into an alerting data packet format transmittable to the grouped clients, an alerting data storage unit for storing the converted alerting data packet, and an alerting event transmitter for transmitting the client list and the alerting data packet to the master client of the uppermost group from among the grouped clients.

According to the present invention, network or system resources may be saved by transmitting an event to the grouped master client in the event alerting system, compared to the conventional alerting service.

DESCRIPTION OF DRAWINGS

FIG. 10 and FIG. 11 show first grouped results and data for event alerting using dynamic local grouping according to the exemplary embodiment of the present invention.

FIG. 12 to FIG. 14 show second grouped results and data for event alerting using dynamic local grouping according to the exemplary embodiment of the present invention.

FIG. 15 to FIG. 17 show third grouped results and data for event alerting using dynamic local grouping according to the exemplary embodiment of the present invention.

FIG. 18 shows an attempt of another connection when an attempt of a connection is failed in the dynamic local grouping according to the exemplary embodiment of the present invention.

FIG. 19 shows an acknowledgment of task completion in the dynamic local grouping according to the exemplary embodiment of the present invention.

BEST MODE

Figure 1:
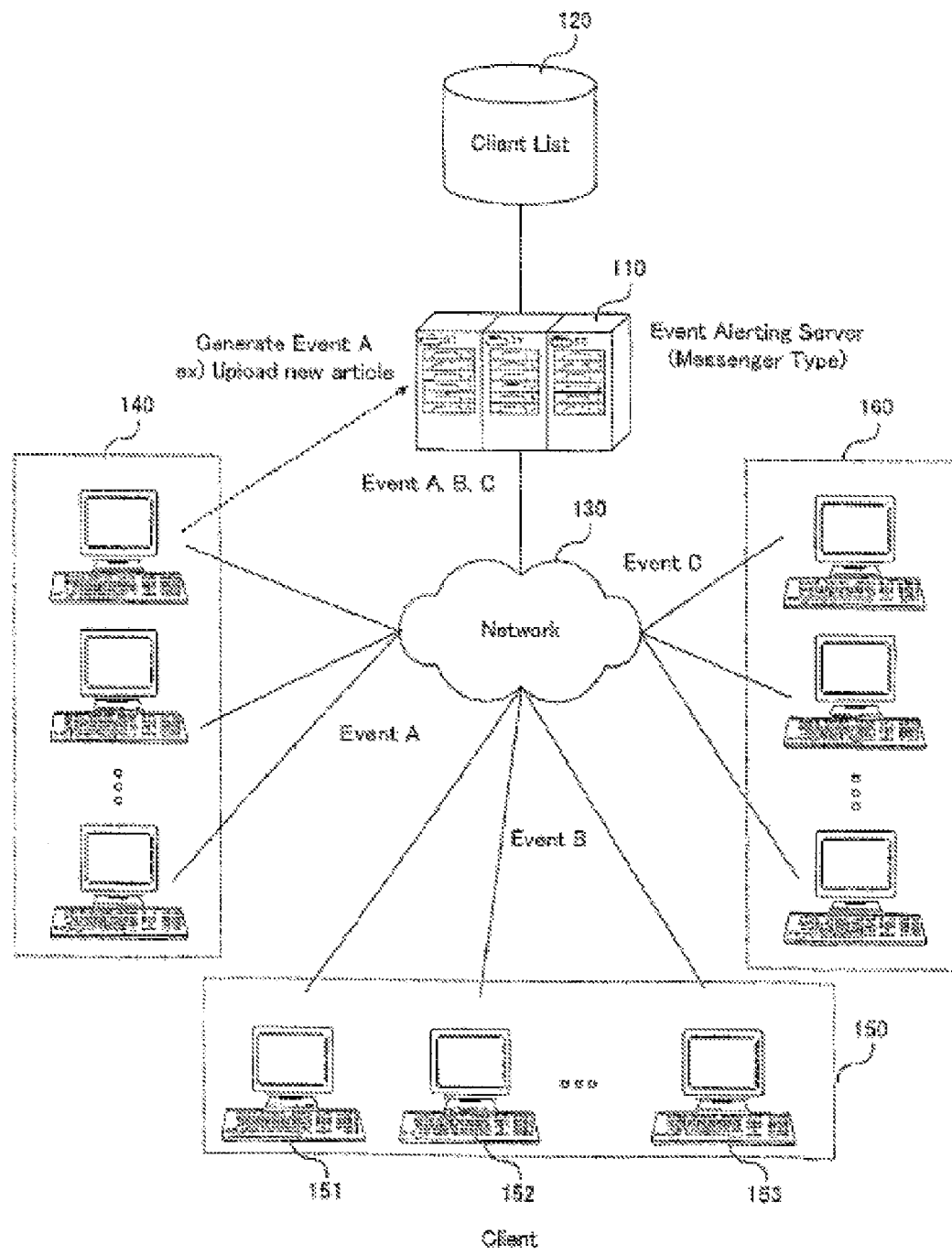
FIG. 1 shows a conventional messenger-based event alerting system.
Figure 2:
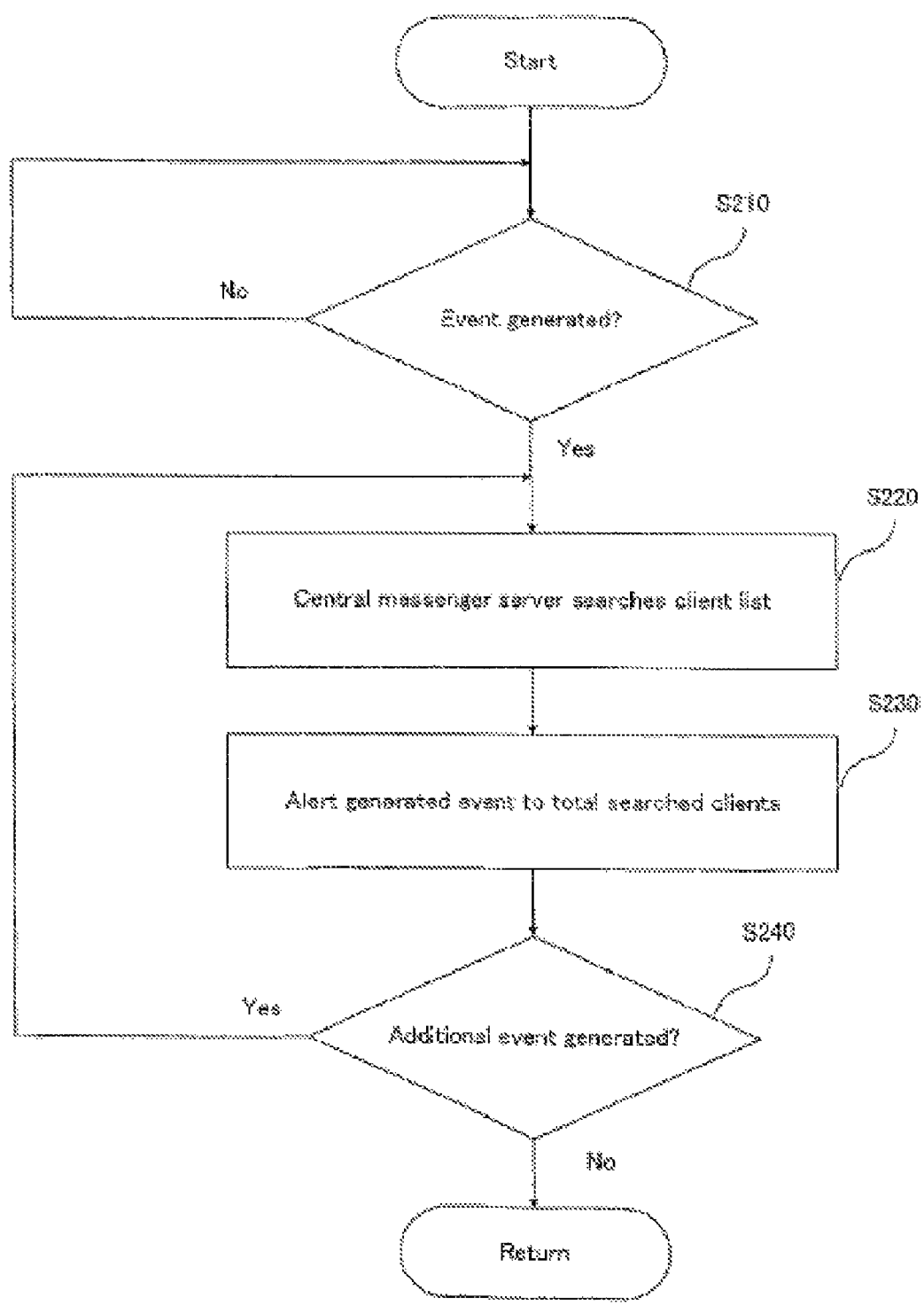
FIG. 2 shows a flowchart for a conventional messenger-based event alerting method.
Figure 3:
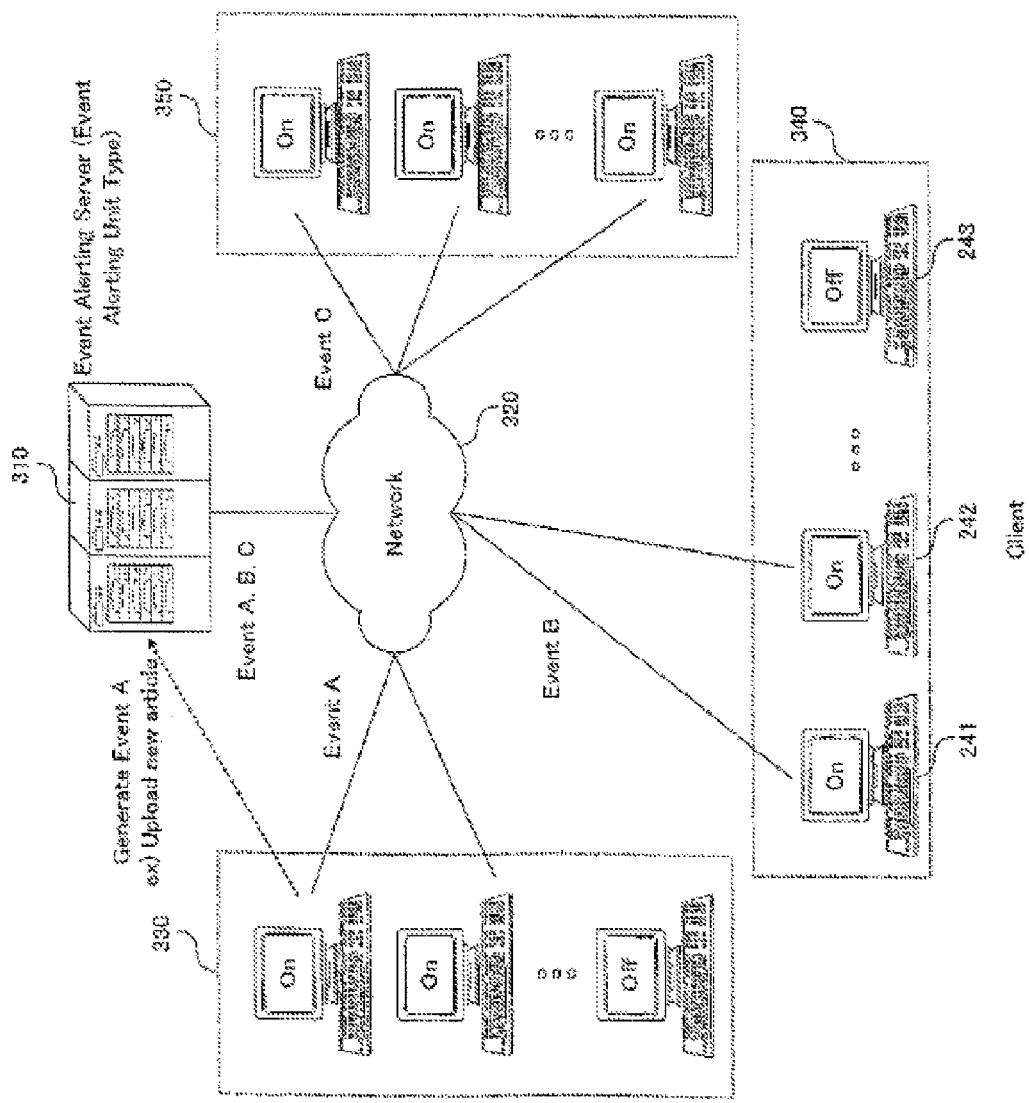
FIG. 3 shows a conventional event alerting system using an event alerting unit.
Figure 4:
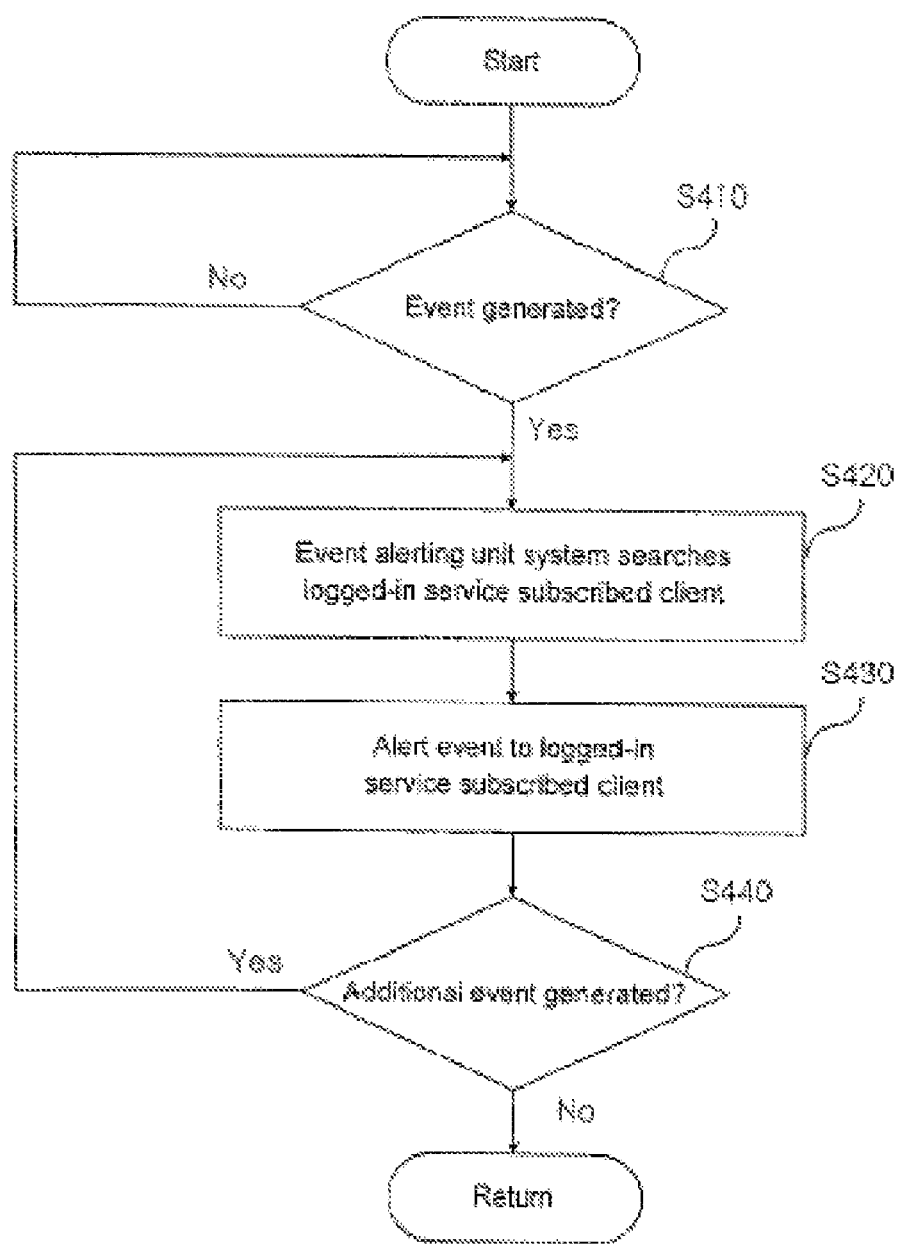
FIG. 4 shows a flowchart for a conventional event alerting method using an event alerting unit.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

Figure 5:
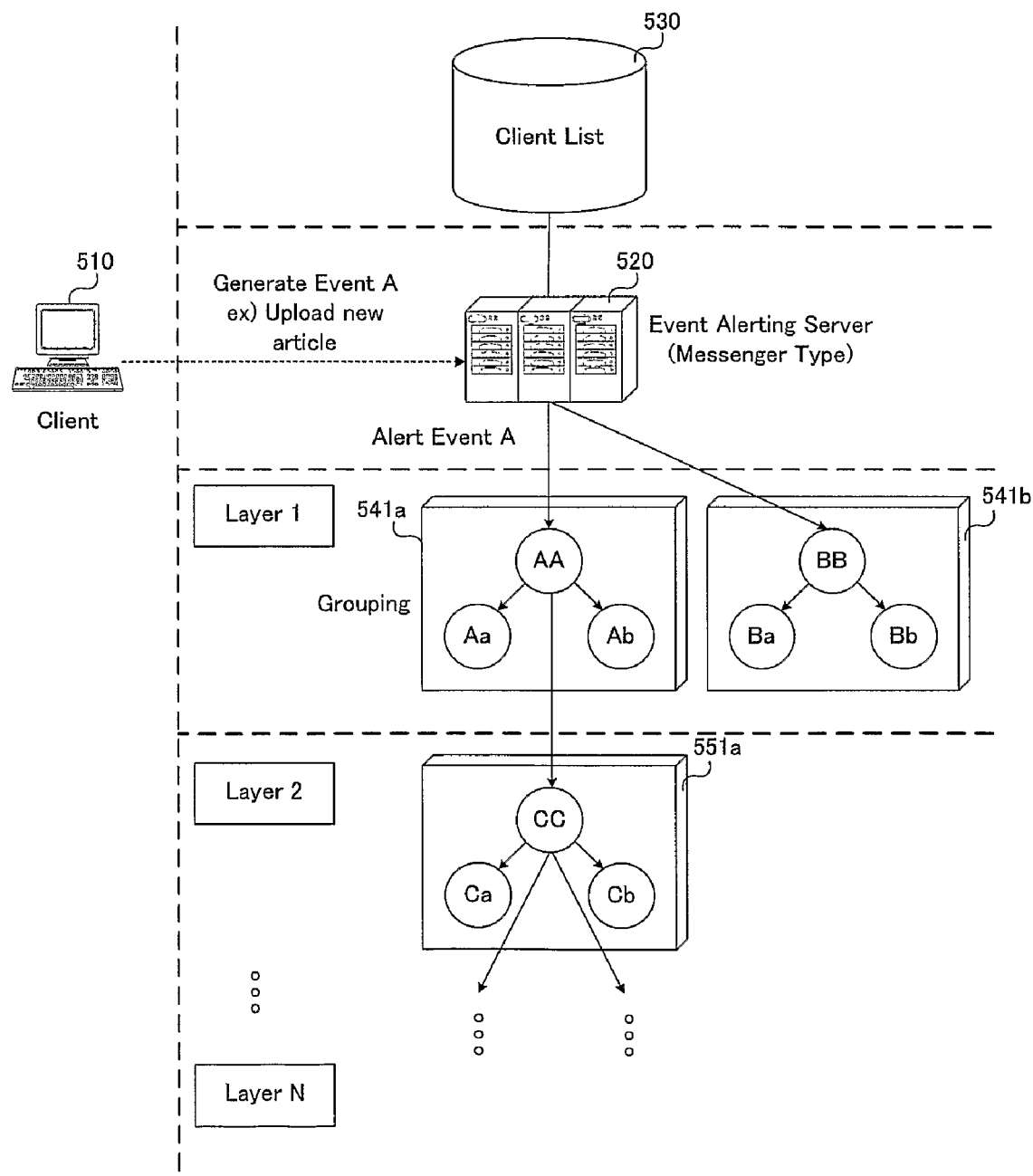
FIG. 5 shows a dynamic local grouping method according to an exemplary embodiment of the present invention.

FIG. 5 shows a dynamic local grouping method according to an exemplary embodiment of the present invention.

First, when event alerting is provided to an event alerting server 520 from a client 510, the event alerting server 520 takes a member list, for example, a client list 530 from a café database. In this instance, the event alerting server 520 groups all the clients to be alerted of the event according to a predefined method with reference to the member list information.

Next, the event alerting server 520 transmits a grouped member list and alerting information to masters of specific groups from among the dynamically grouped groups 541a and 541b. For example, the event alerting server 520 transmits a member list and alerting information to master clients AA and BB on the first layer, the master client AA transmits alerting information to slave clients Aa and Ab in the group of the master client AA, and the master client BB transmits alerting information to slave clients Ba and Bb in the group of the master client BB.

Next, the master client AA of one group dynamically re-groups a sub-group 551a with the member list, and transmits a sub-group list and alerting information to masters of the sub-group 551a. For example, the master client AA of the first layer transmits a member list and alerting information to a master client CC of the sub-group 551a of a second layer. Also, the master client CC of the sub-group 551a transmits alerting information to slave clients Ca and Cb of the sub-group 551a.

As a result, grouping and transmission are performed until the alerting events are transmitted to slave clients of all layers. An event alerting system using dynamic local grouping will now be described with reference to FIG. 6, and a detailed grouping process will be described later.

Figure 6:
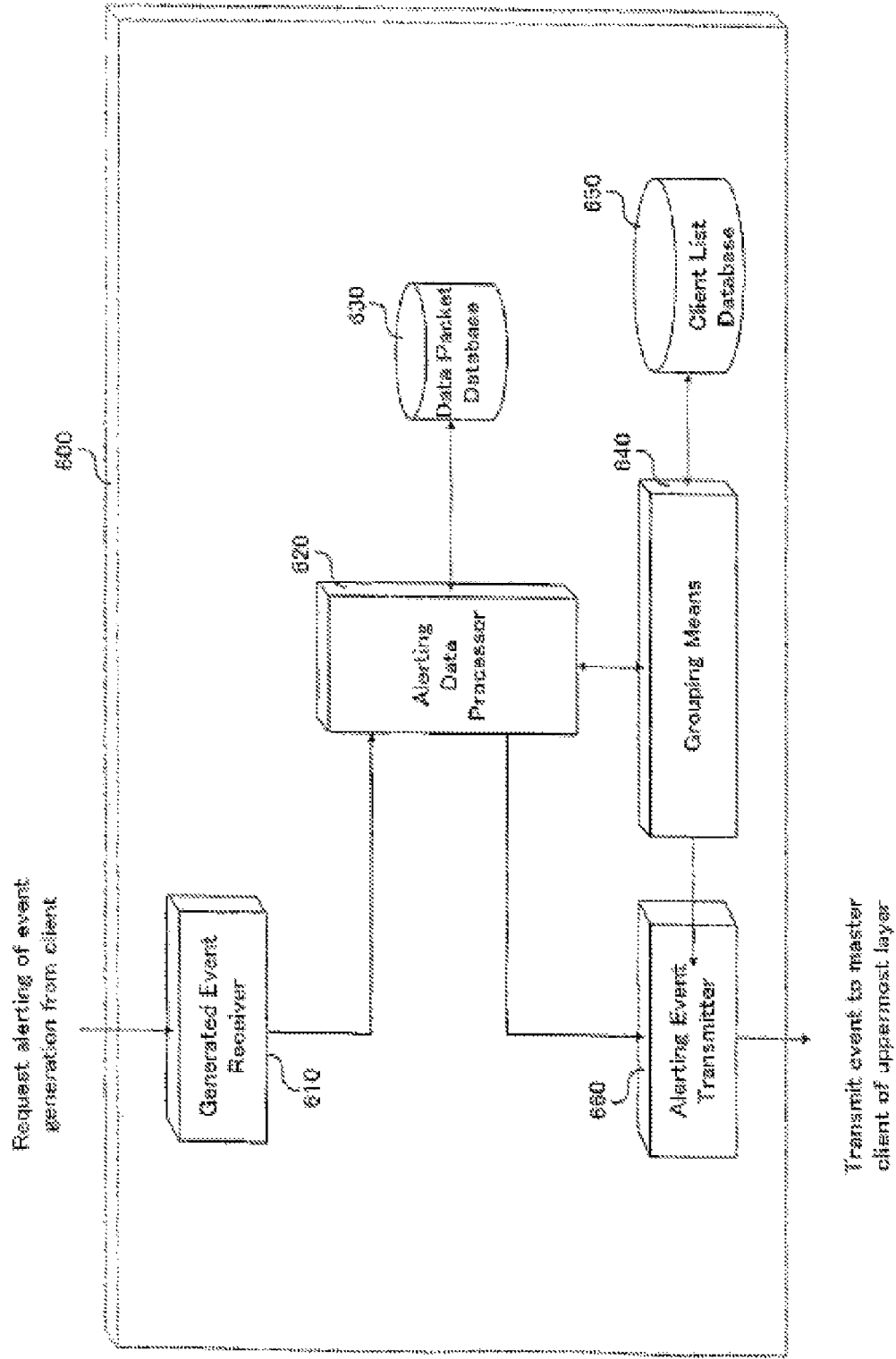
FIG. 6 shows a schematic diagram of an event alerting system using dynamic local grouping according to the exemplary embodiment of the present invention.

FIG. 6 shows a schematic diagram of an event alerting system using dynamic local grouping according to the exemplary embodiment of the present invention.

Referring to FIG. 6, the event alerting system 600 using dynamic local grouping includes a generated event receiver 610, an alerting data processor 620, a data packet database 630, a grouping means 640, a client list database 650, and an alerting event transmitter 660.

The generated event receiver 610 receives an event alerting request from a random client.

The client list database 650 stores personal information on a plurality of clients having joined the event alerting service.

The grouping means 640 performs grouping per local areas with reference to distances to the respective clients according to the client list when the client generates an event to request alerting. Also, it is determined to establish a master client or a slave client according to a data rate of transmitting/receiving a ping and a pong to/from the client.

The alerting data processor 620 converts the alerting event into an alerting data packet format transmittable to the grouped clients.

The data packet database 630 is an alerting data storage unit and stores the converted alerting data packet.

The alerting event transmitter 660 transmits the client list and the alerting data packet to the master client of the uppermost group from among the grouped clients.

Figure 7:
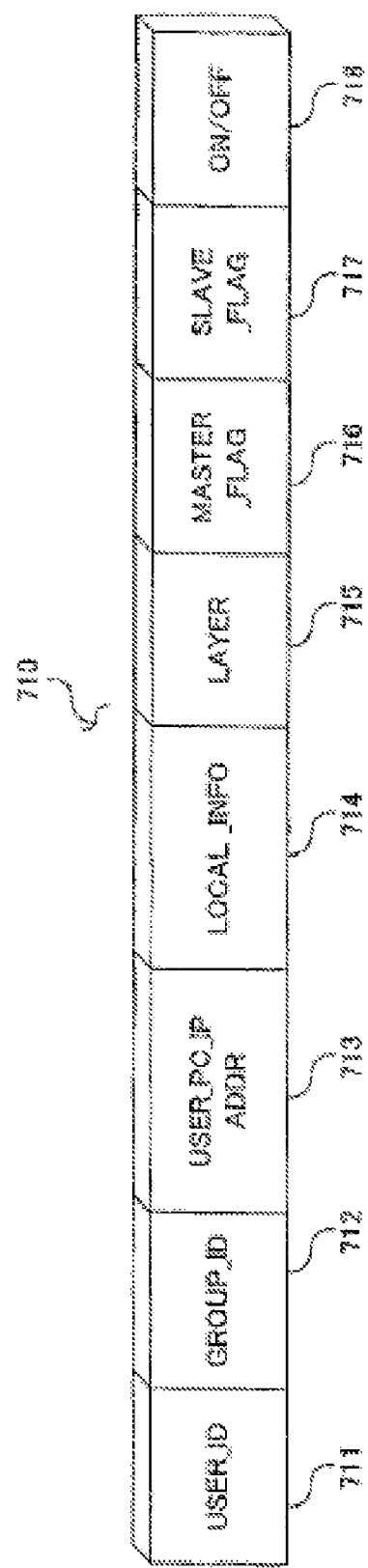
FIG. 7 and FIG. 8 show a data format and a packet for an event alerting system using dynamic local grouping according to the exemplary embodiment of the present invention.
Figure 8:
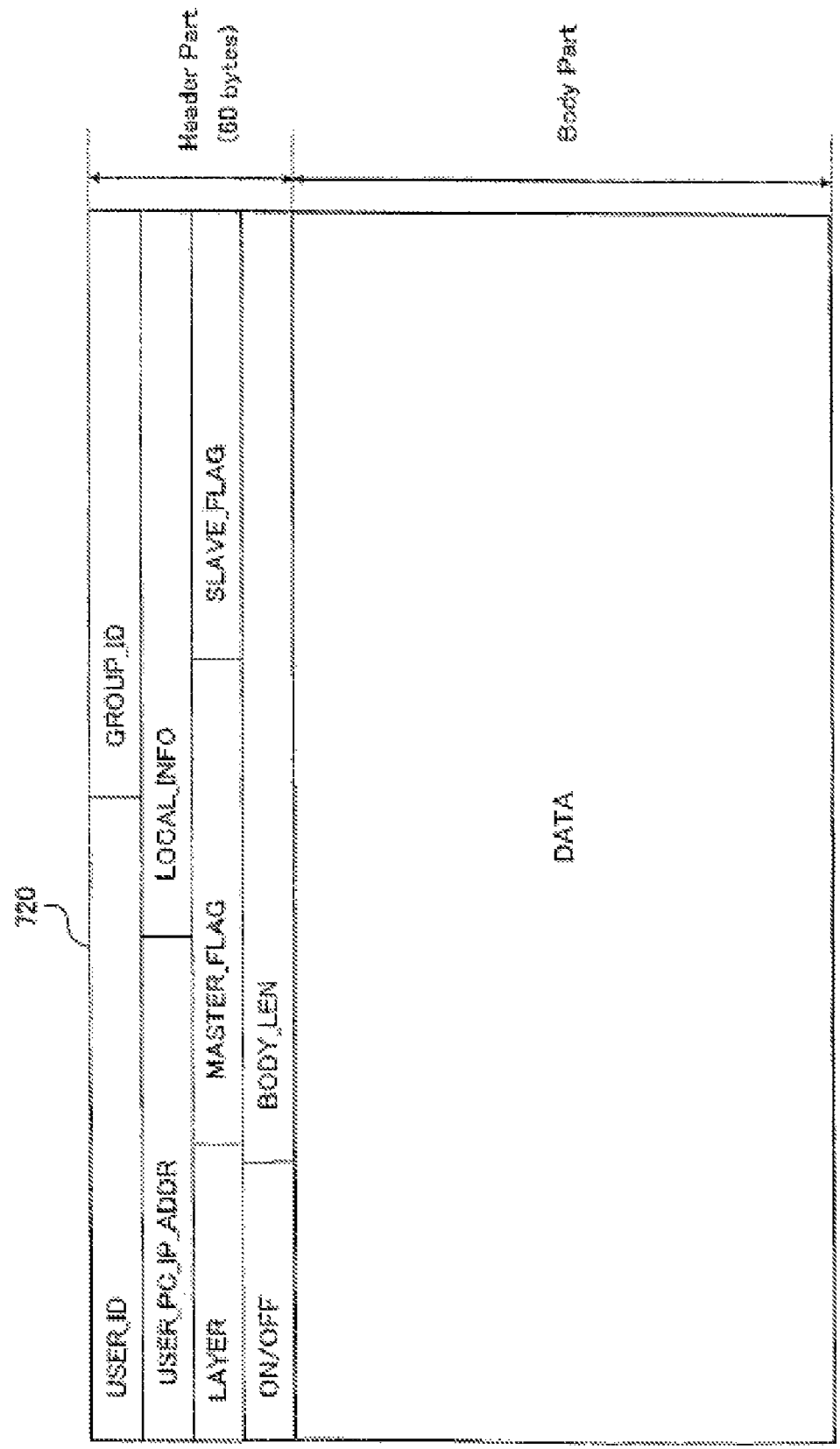

FIG. 7 and FIG. 8 show a data format and a packet for an event alerting system using dynamic local grouping according to an exemplary embodiment of the present invention.

Referring to FIG. 7, as to the data format used for the event alerting system using dynamic local grouping, a USER_ID 711 is a user ID, a GROUP_ID 712 is a dynamically given group ID, and a USER_PC_IP_ADDR 713 is a user PC IP address and is updated each time the user logs in. Also, a LOCAL_INFO 714 is a local code of the user, for example, a postal code or a telephone number, a LAYER 715 represents information for indicating on which layer the user PC is provided from the server. Further, a MASTER_FLAG 716 represents information indicating whether each group is set to be a master, and a SLAVE_FLAG 717 represents information indicating whether each group is set to be a slave, and an ON/OFF 718 represents whether the client is in the online status.

Referring to FIG. 8, as to the data packet used for the event alerting system using dynamic local grouping, the USER_ID 711 has 20 bytes, the GROUP_ID 712 has 10 bytes, the USER_PC_IP_ADDR 713 has 15 bytes, the LOCAL_INFO 714 has 6 bytes, the LAYER 715 has 2 bytes, the MASTER_FLAG 716 has 1 byte, the SLAVE_FLAG 717 has 1 byte, the ON/OFF 718 has 1 byte, and a BODY_LEN for indicating the length of the alerting data has 6 bytes, when the header part except the alerting data of the body part has 60 bytes.

Figure 9:
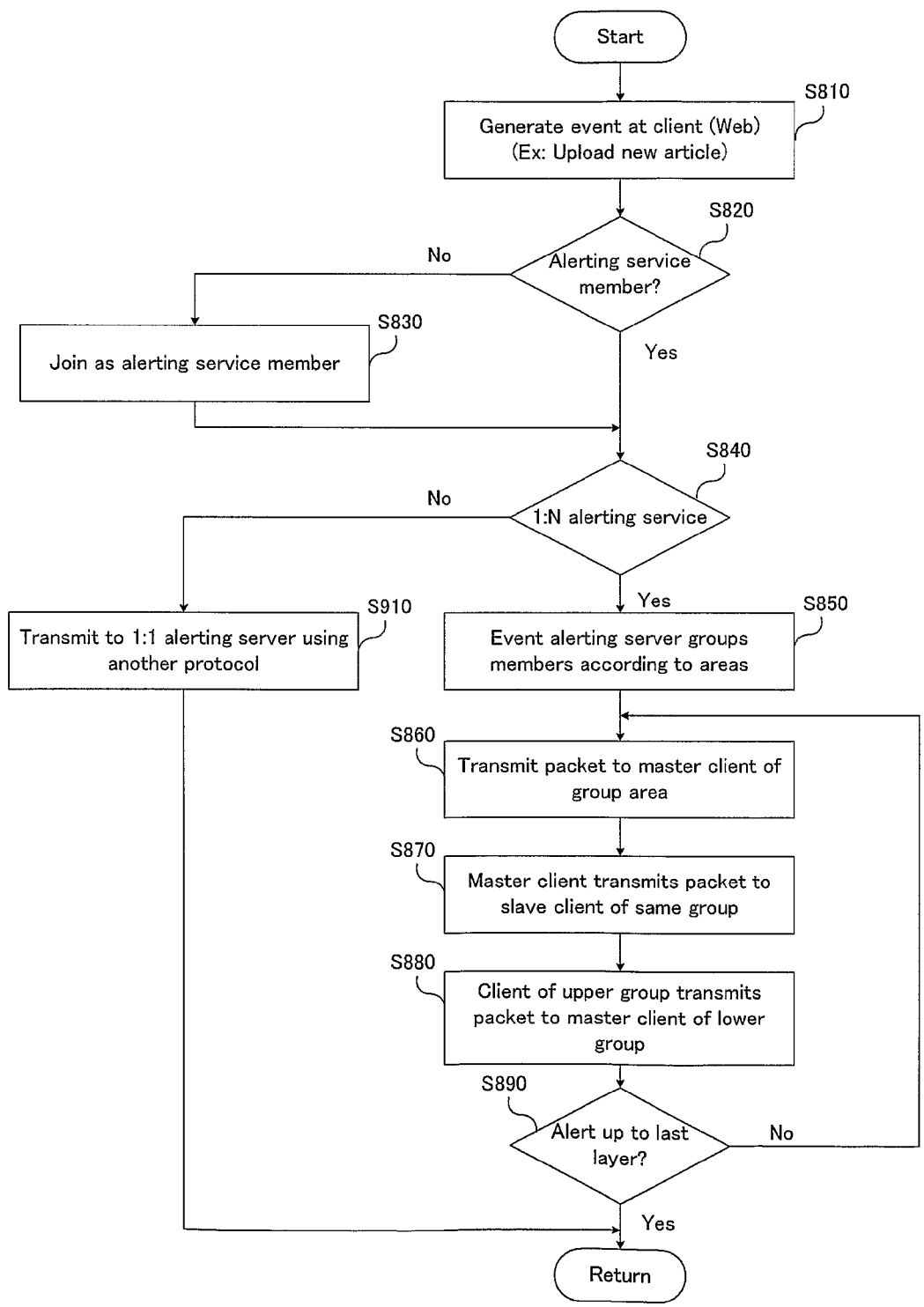
FIG. 9 shows a flowchart of an event alerting method using dynamic local grouping according to the exemplary embodiment of the present invention.

FIG. 9 shows a flowchart of an event alerting method using dynamic local grouping according to an exemplary embodiment of the present invention.

Referring to FIG. 9, in the event alerting method using dynamic local grouping, when a client on the web generates an event for uploading a new article in step S810, it is checked whether the client is an alerting service member in step S820, a predetermined registration process is performed to register the client as an alerting service member in step S830 when the client is not an alerting service member, and it is checked whether the alerting service is a 1:N alerting service in step S840 when the client is an alerting service member.

When the alerting service is found to be a 1:N alerting service, the event alerting server checks the client list, for example, a member list and groups all the members according to local areas in step S850. In this instance, a user client at the time of log in receives the USER_PC_IP_ADDR and the LOCAL_INFO, uses them to establish the shortest distance and the GROUP_ID, and stores corresponding results in a grouping database. In this instance, the server for alerting a 1:N event combines USER_PC_IP_ADDRs of the same ISPs and combines neighboring local areas according to local information, in the case of providing group IDs by combining the USER_PC_IP_ADDR and the LOCAL_INFO.

Next, a client list and alerting data are transmitted to master clients of respective group local areas on the first layer in step S860, and the master client transmits alerting data to the slave client of the same group in step S870.

A master client of an upper group transmits a client list and alerting data to a master client of a lower group, and in this instance, the master client of each lower group transmits alerting data to the slave client of the same group in step S880, which is repeated up to the last layer in step S890.

When the alerting service is not a 1:N alerting service but a 1:1 alerting service in the previous step S840, an additional protocol is used to transmit alerting data to the 1:1 alerting server in step S910.

Figure 10:
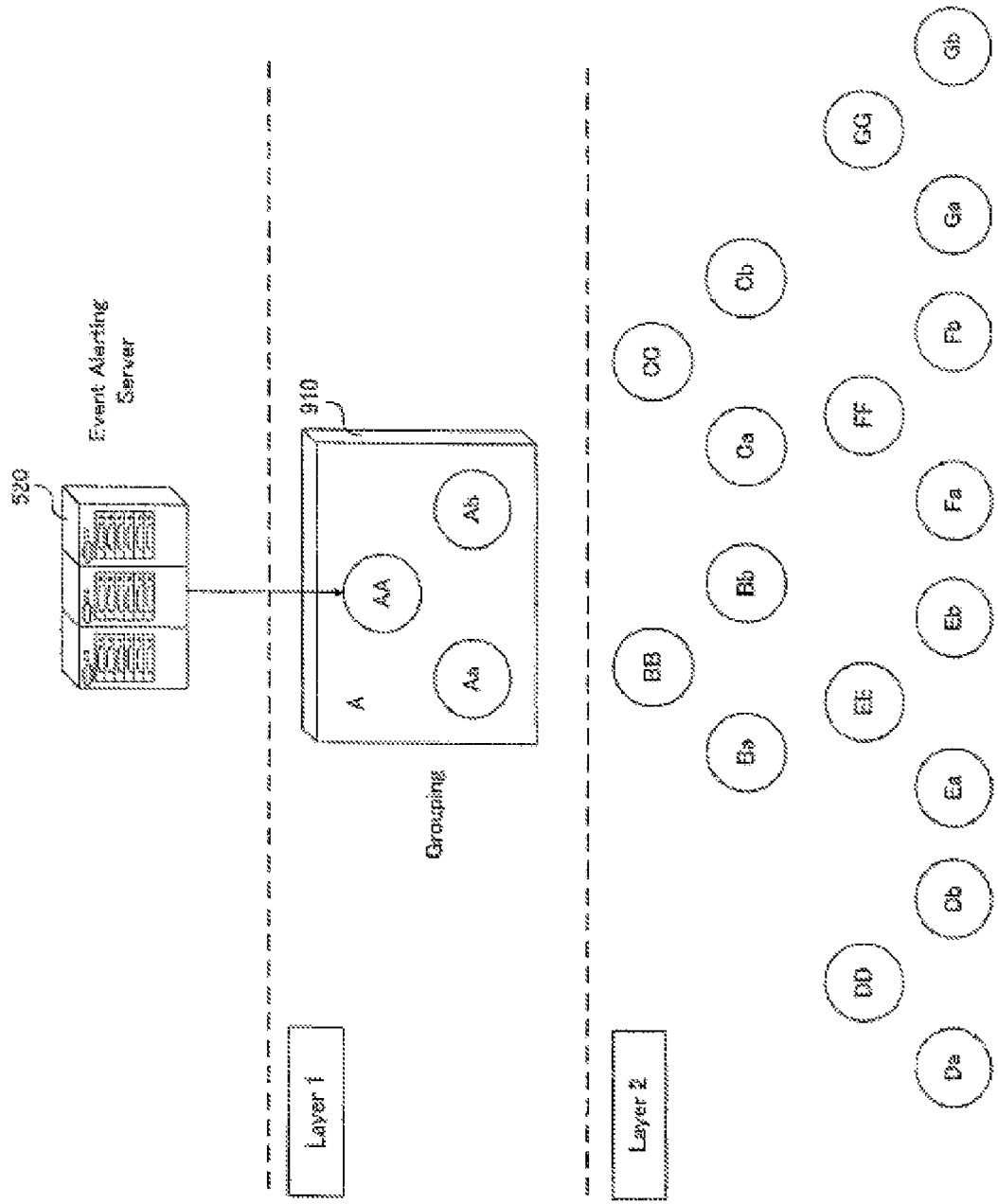

FIG. 10 and FIG. 11 show first grouped results and data for event alerting using dynamic local grouping according to the exemplary embodiment of the present invention.

Referring to FIG. 10, the master client AA in the group A on the first layer uses the received data to group them into groups B and C on the second layer, and the master client AA in the group A on the first layer transmits alerting data to the slave clients Aa and Ab of the same group. In this instance, the master client AA in the group A on the first layer transmits the grouped client list and alerting information to the master clients BB and CC of groups B and C on the second layer.

FIG. 11 shows dynamically grouped data when the event alerting server performs initial grouping and transmits the data to the master client AA of the group A on the first layer in the 1:N alerting service.

Referring to FIG. 11, the 1:1 event alerting server receives USER_PC_IP_ADDR and LOCAL_INFO when a user client logs in, and the 1:1 event alerting server uses the information to establish the shortest distance and a GROUP_ID, and stores corresponding results in the data packet database 650.

For example, it is assumed that the USER_IDs are respectively given to be AA, Aa, and Ab, the USER_PC_IP_ADDRs of M, Aa, and Ab are given as 220.75.249.30, 220.75.249.35, and 220.75.249.40, and LOCAL_INFOs are given as 135-080, 135-060, and 135-085.

In this instance, the local information 135-080, 135-060, and 135-085 represent postal codes and may further include cable telephone numbers. In detail, the first three digits of 135 in the postal code indicate a corresponding region, and hence, the corresponding distance can be known, and the first three digits of 135 are used as information for determining the shortest distance to the event alerting server. Further, the digits of 220 common to the USER_PC_IP_ADDRs of 220.75.249.30, 220.75.249.35, and 220.75.249.40 represent the ISP of the corresponding region, and grouping can be performed with reference to the digits.

When allocating group IDs with the combination of the USER_PC_IP_ADDRs and the LOCAL_INFO, the event alerting server combines the same ISPs according to the USER_PC_IP_ADDR information and combines neighboring regions according to local code information. In this instance, the first priority is given to the local code and the second priority is given to the USER_PC_IP_ADDR.

Also, GROUP_IDs are only provided to the clients that are adjacent to the event alerting server. For example, the client having received the group ID is provided to Layer 1, and other clients are provided to Layer 2.

Further, for example, the clients in the group of the first layer are established to be a master and slaves, and a master flag or slave flags are established. For example, the master flag and the slave flags are defined by comparing the shortest path with the master client AA of the group A on the first layer, and may have the value of 0 or 1. In this instance, it is known that the master flag of AA is changed to the value of 1 and the slave flags of Aa and Ab are changed to the value of 1 in the group with the group ID of A.

Figure 12:
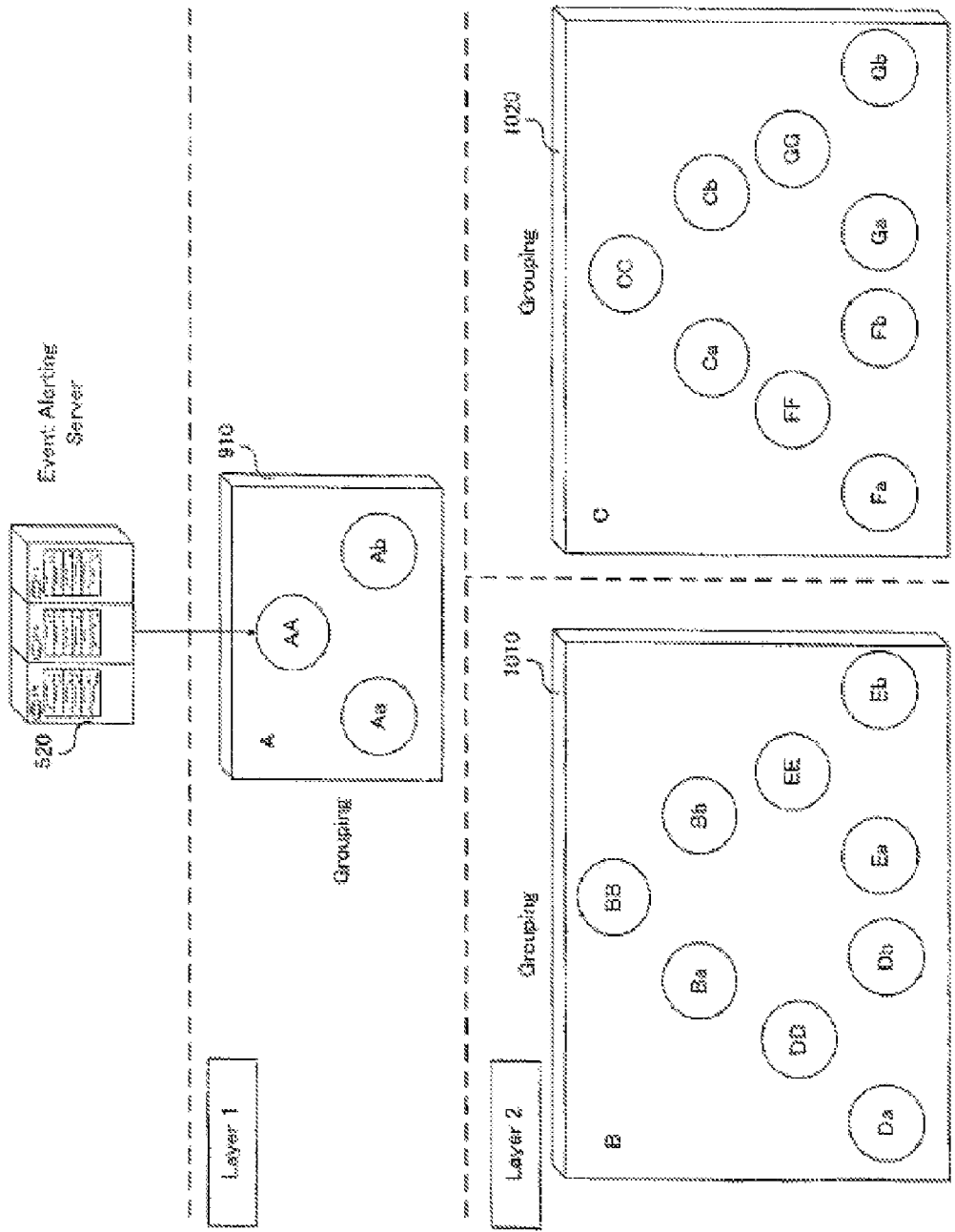

FIG. 12 to FIG. 14 show second grouped results and data for event alerting using dynamic local grouping according to the exemplary embodiment of the present invention.

FIG. 12 shows second grouping for event alerting using dynamic local grouping according to the embodiment of the present invention, FIG. 13 shows dynamically grouped data by the master of the group A, and FIG. 14 shows data transmitted to the masters of the groups B and C from the group A in the 1:N alerting service according to the embodiment of the present invention.

That is, the master client AA of the group A uses the data received from the event alerting server 520 to group them to be in the groups B and C and transmits the data to the respective master clients BB and CC, and the master client AA of the group A transmits alerting data to the slave clients Aa and Ab of the group A. Also, the master client AA of the group A transmits a grouped client list and alerting information to the master clients BB and CC of the groups B and C.

Figure 15:
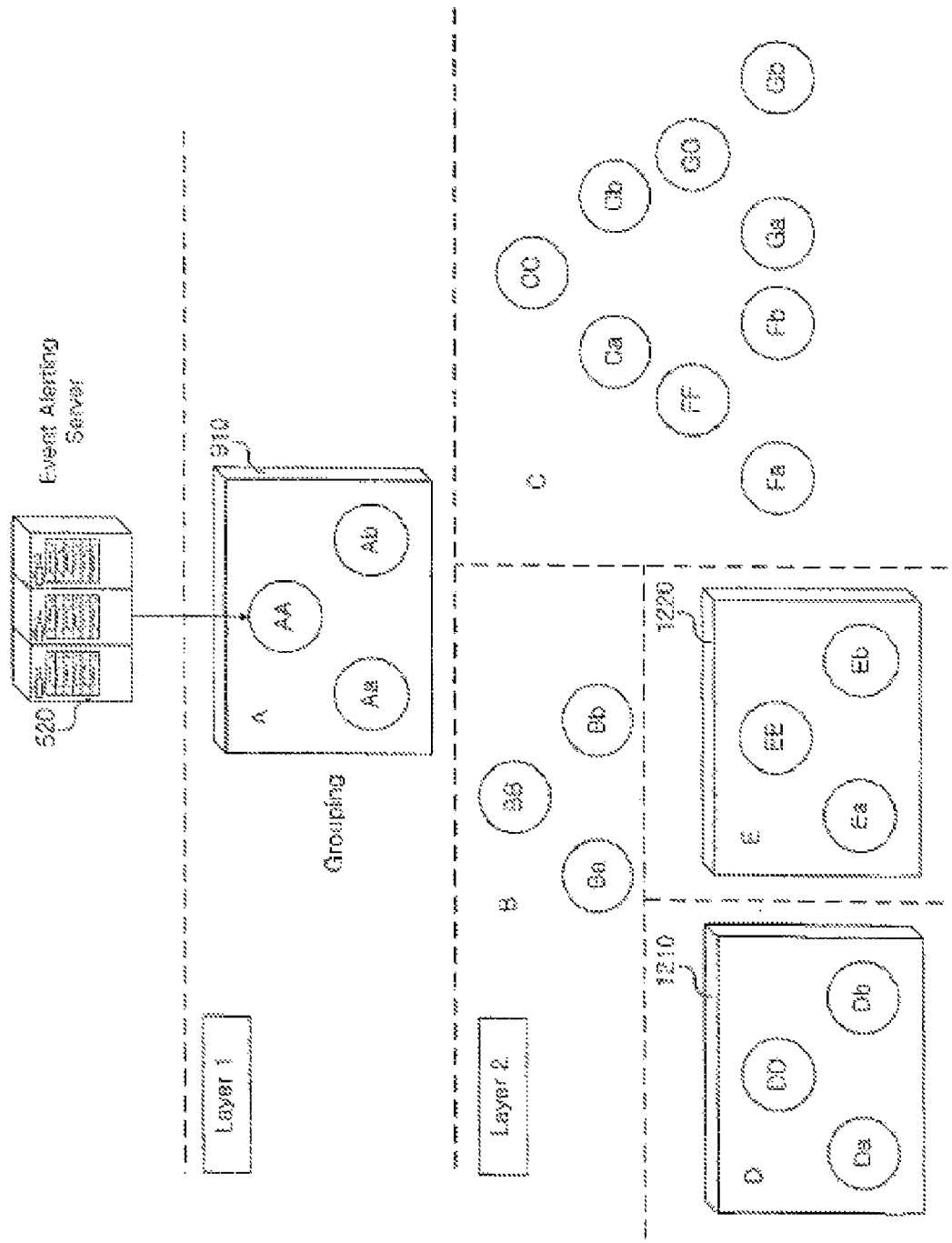

FIG. 15 to FIG. 17 show third grouped results and data for event alerting using dynamic local grouping according to the exemplary embodiment of the present invention.

FIG. 15 shows third grouping for event alerting using dynamic local grouping according to the embodiment of the present invention, FIG. 16 shows dynamically grouped data by the master of the group B, and FIG. 17 shows data transmitted to the master clients of the groups D and E from the group B in the 1:N alerting service according to the embodiment of the present invention.

That is, the master client BB of the group B uses the received data to group them to be in the groups D and E and transmits the data to respective master clients DD and EE, and the master client BB of the group B transmits alerting data to slave clients Ba and Bb of the group B. Also, the master client BB of the group B transmits a grouped client list and alerting information to the master clients DD and EE of the groups D and E.

Also, the master clients DD and EE of the groups D and E transmit the received data to slaves of the groups D and E, and dynamic grouping and event information transmission are repeated until the event is alerted to all the clients up to the last layer.

FIG. 18 shows an attempt of another connection when an attempt of a connection is failed in the dynamic local grouping according to the exemplary embodiment of the present invention.

Referring to FIG. 18, when a connection of a master of a client group to a master of another client group is failed in the 1:N alerting service according to the embodiment of the present invention, for example, when the master client BB of the group B attempts to transmit a client list and alerting information to the master client EE of the group E 1210 and a connection therebetween is failed, the master client BB of the group B compares the paths to the slave clients Ea and Eb of the group E to find the shortest path, and defines a master client, and when the connection is allowed, the master client BB of the group B attempts to transmit a client list and alerting information. In this instance, when the connection is failed, ON/OFF information is changed from 1 to 0. Also, the master flag of the slave client Ea is changed to 1.

FIG. 19 shows an acknowledgment of task completion in the dynamic local grouping according to the exemplary embodiment of the present invention.

Referring to FIG. 19, when the master client EE of the group E 1310 is down while transmitting data in the 1:N alerting service, the alerting message to be subsequently transmitted to the clients of a sub-group is lost, and hence, when all the tasks are finished, the master client EE of the group E 1310 must return an acknowledgment message to the master client BB of the group B. That is, a child master must transmit an acknowledgment message to a parent master when the child master finishes the event alerting task. When the master client BB of the group B receives no acknowledgment message from the master client EE of the group E, a group master is established again from among the clients grouped as E and data are then transmitted.

Therefore, according to the present invention, grouping is performed based on the user PC IP address in the client list and local information, and when an event is transmitted to the master client of a corresponding group, the master client of the corresponding group dynamically performs re-grouping again and alerts the event.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

INDUSTRIAL APPLICABILITY

According to the present invention, server loads and network traffic are reduced compared to the conventional alerting service, by transmitting events to the grouped master client in the event alerting system.

The invention claimed is:

1. An event alerting method, using dynamic local grouping, in which an event alerting server transmits an event message to a plurality of clients connected on a network, the event alerting method comprising:
    receiving an event alerting request from clients having generated events, or generating an event by the event alerting server;
    grouping the clients according to areas with reference to a transmission distance to the respective clients according to a client list by the event alerting server;
    transmitting a client list of the grouped areas and an alerting data packet to a plurality of master clients selected by the grouping process; and
    transmitting a client list and an alerting data packet to a master client of a lower group from the master client of an upper group up to the last layer established by performing the grouping process again.

2. The event alerting method of claim 1, wherein the transmitting of the client list and the alerting data packet comprises:
    performing grouping for respective layers until the last layer at which the event alerting is finished, and allowing transmission of the client list and the alerting data packet between a plurality of clients which are designated as the master client or a slave client according to a master flag or a slave flag established by the grouping process.

3. The event alerting method of claim 1, wherein the master client transmits an alerting data packet to a slave client of the same group.

4. The event alerting method of claim 1, wherein the grouping of the clients comprises:
    checking whether the requested event alerting is 1:N event alerting;
    grouping the clients for areas according to the client list by the event alerting server when the requested event alerting is found to be 1:N event alerting; and
    transmitting the client list and the alerting data packet to a 1:1 alerting server when the requested event alerting is not 1:N event alerting.

5. The event alerting method of claim 1, wherein a transmission distance with the client is determined with reference to user PC IP address information or local information.

6. The event alerting method of claim 5, wherein the user PC IP address is updated each time the user logs in and is stored in the client list database.

7. The event alerting method of claim 5, wherein same Internet service providers (ISPs) are grouped in a group according to the user PC IP address.

8. The event alerting method of claim 5, wherein the local information is one of a postal code and a cable telephone number.

9. The event alerting method of claim 1, wherein the alerting data packet includes a user ID, a group ID, a user PC IP address, local information, a layer, and a master flag or a slave flag.

10. The event alerting method of claim 1, wherein when a master client of the upper group is not connected to a master client of a lower group, the shortest distance with other slave clients of the same lower group is compared, and a master client of the lower group is established again to attempt a connection.

11. The event alerting method of claim 1, wherein when the master client of the lower group finishes the event alerting task assigned to the master client of the lower group, an acknowledgement message is transmitted to the master client of the upper group.

12. The event alerting method of claim 11, wherein when the master client of the upper group receives no acknowledgment message from the master client of the lower group, a master client is established from among other slave clients of a lower group and the client list and alerting data are transmitted.

13. An event alerting system, using dynamic local grouping, in which an event alerting server transmits an event message to a plurality of clients connected on a network, the event alerting system comprising:
a client list database configured to store personal information on a plurality of clients having joined an event alerting service
a client grouping element configured to group the clients per areas with reference to transmission distances to the respective-clients according to the client list when the client requests alerting by generating an event; an alerting data processor configured to convert the alerting data into an alerting data packet format transmittable to the grouped clients;
an alerting data storage unit configured to store the converted alerting data packet; and
an alerting event transmitter configured to transmit the client list and the alerting data packet to a master client of the uppermost group from among the grouped clients, the master client configured to re-group the clients per areas with reference to transmission distances to the respective re-grouped clients.

14. The event alerting system of claim 13, wherein personal information of the respective clients comprises a user PC IP address or local information.

15. The event alerting system of claim 14, wherein the user PC IP address is updated each time the user logs in, and is stored in the client list database.

16. The event alerting system of claim 14, wherein same Internet service providers (ISPs) are grouped according to the user PC IP addresses.

17. The event alerting system of claim 14, wherein the transmission distance to the respective clients is determined with reference to the user PC IP address or the local information.

18. The event alerting system of claim 17, wherein the local information is a postal code or a cable telephone number.

19. The event alerting system of claim 13, wherein the clients respectively have an event alerting program installed therein and receive the alerting event.

20. The event alerting system of claim 13, wherein the alerting data packet includes a user ID, a group ID, a user PC IP address, local information, and a master flag or a slave flag.

21. The event alerting system of claim 20, wherein a master flag or a slave flag is determined according to a transmission rate at which the event alerting server is configured to transmit to and receive from the client a ping and a pong.

22. A non-transitory computer-readable storage medium comprising an executable program, which when executed, is configured to perform using dynamic local grouping, in which an event alerting server transmits an event message to a plurality of clients connected on a network, a method comprising:
receiving an event alerting request from clients having generated events, or generating an event by the event alerting server;
grouping the clients according to areas with reference to a transmission distance to the respective clients according to a client list by the event alerting server;
transmitting a client list of the grouped areas and an alerting data packet to a plurality of master clients selected by the grouping process; and
transmitting a client list and an alerting data packet to a master client of a lower group from the master client of an upper group up to the last layer established by performing the grouping process again.

23. The non-transitory computer-readable storage medium of claim 22, wherein the transmitting of the client list and the alerting data packet comprises:
performing grouping for respective layers until the last layer at which the event alerting is finished, and allowing transmission of the client list and the alerting data packet between a plurality of clients which are designated as the master client or a slave clients according to a master flag or a slave flag established by the grouping process.

24. The non-transitory computer-readable storage medium of claim 22, wherein the master client transmits an alerting data packet to a slave client of the same group.

25. The non-transitory computer-readable storage medium of claim 22, wherein the grouping of the clients comprises:
checking whether the requested event alerting is 1:N event alerting;
grouping the clients for areas according to the client list by the event alerting server when the requested event alerting is found to be 1:N event alerting; and
transmitting the client list and the alerting data packet to a 1:1 alerting server when the requested event alerting is not 1:N event alerting.

26. The non-transitory computer-readable storage medium of claim 22, wherein a transmission distance with the client is determined with reference to user PC IP address information or local information.

27. The non-transitory computer-readable storage medium of claim 26, wherein the user PC IP address is updated each time the user logs in and is stored in the client list database.

28. The non-transitory computer-readable storage medium of claim 26, wherein same Internet service providers (ISPs) are grouped in a group according to the user PC IP address.

29. The non-transitory computer-readable storage medium of claim 26, wherein the local information is one of a postal code and a cable telephone number.

30. The non-transitory computer-readable storage medium of claim 22, wherein the alerting data packet includes a user ID, a group ID, a user PC IP address, local information, a layer, and a master flag or a slave flag.

31. The non-transitory computer-readable storage medium of claim 22, wherein when a master client of the upper group is not connected to a master client of a lower group, the shortest distance with other slave clients of the same lower group is compared, and a master client of the lower group is established again to attempt a connection.

32. The non-transitory computer-readable storage medium of claim 22, wherein when the master client of the lower group finishes the event alerting task assigned to the master client of the lower group, an acknowledgement message is transmitted to the master client of the upper group.

33. The non-transitory computer-readable storage medium of claim 32, wherein when the master client of the upper group receives no acknowledgment message from the master client of the lower group, a master client is established from among other slave clients of a lower group and the client list and alerting data are transmitted.

* * * * *

UNITED STATES PATENT AND TRADEMARK OFFICE
CERTIFICATE OF CORRECTION

| | | |
|---|---|---|
| PATENT NO. | : 8,281,320 B2 | Page 1 of 1 |
| APPLICATION NO. | : 11/571505 | |
| DATED | : October 2, 2012 | |
| INVENTOR(S) | : Choi et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1,396 days.

Signed and Sealed this
Nineteenth Day of August, 2014

Michelle K. Lee
*Deputy Director of the United States Patent and Trademark Office*